United States Patent
Kumar et al.

(10) Patent No.: US 11,552,941 B2
(45) Date of Patent: Jan. 10, 2023

(54) METHOD AND SYSTEM FOR MANAGING WORKSTATION AUTHENTICATION

(71) Applicant: SAUDI ARABIAN OIL COMPANY, Dhahran (SA)

(72) Inventors: Prem Kumar, Dhahran (SA); Mohammed A. Batouq, Dhahran (SA); Omar A. Mohisin, Abqaiq (SA); Eid N. Rashidi, Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 79 days.

(21) Appl. No.: 17/085,237

(22) Filed: Oct. 30, 2020

(65) Prior Publication Data

US 2022/0141212 A1 May 5, 2022

(51) Int. Cl.
*G06F 21/00* (2013.01)
*H04L 9/40* (2022.01)

(52) U.S. Cl.
CPC ........ *H04L 63/0846* (2013.01); *H04L 63/105* (2013.01); *H04L 63/108* (2013.01)

(58) Field of Classification Search
CPC .. H04L 63/0846; H04L 63/105; H04L 63/108
See application file for complete search history.

(56) References Cited

U.S. PATENT DOCUMENTS

| | | |
|---|---|---|
| 5,694,595 A | 12/1997 | Jacobs et al. |
| 8,495,700 B2 | 7/2013 | Shahbazi |
| 9,027,077 B1 * | 5/2015 | Bharali ................... G06F 21/00 726/1 |
| 2008/0010453 A1 | 1/2008 | Hamid |
| 2008/0114683 A1 * | 5/2008 | Neveu ................ G06Q 10/1091 705/50 |
| 2009/0138589 A1 * | 5/2009 | Wunderlich .......... G06F 16/958 709/224 |

(Continued)

OTHER PUBLICATIONS

International Search Report and Written Opinion of the International Searching Authority issued in corresponding International Application No. PCT/US2021/057266, dated Jan. 31, 2022 (14 pages).

(Continued)

*Primary Examiner* — Kendall Dolly
(74) *Attorney, Agent, or Firm* — Osha Bergman Watanabe & Burton LLP

(57) ABSTRACT

A method may include obtaining, from a user device, a request to access a control system among various control systems. The method may further include determining whether a user associated with the user device is authorized to access the control system based on user information associated with the user in a database. The method may further include generating, in response to determining that the user is authorized, a user code associated with a predetermined time period for accessing the control system. The method may further include transmitting the user code to the user device and the control system. The user code may authenticate a user session between the user device and the control system. The method further includes transmitting, in response to the predetermined time period expiring, a command that terminates the user session between the control system by the user device.

20 Claims, 5 Drawing Sheets

(56) References Cited

U.S. PATENT DOCUMENTS

| | | | |
|---|---|---|---|
| 2011/0055909 A1* | 3/2011 | Dowlatkhah | H04L 9/3228 |
| | | | 726/6 |
| 2011/0119716 A1* | 5/2011 | Coleman, Sr. | H04N 21/814 |
| | | | 725/62 |
| 2012/0272298 A1 | 10/2012 | Jibbe et al. | |
| 2018/0137297 A1* | 5/2018 | Drias | H04L 9/0894 |
| 2019/0294768 A1* | 9/2019 | McMurdie | H04L 67/306 |
| 2019/0372977 A1* | 12/2019 | Ben-David | H04L 63/0807 |
| 2021/0158805 A1* | 5/2021 | Sivasubramanian | G06F 16/61 |
| 2022/0052849 A1* | 2/2022 | Kasso | H04L 63/0807 |
| 2022/0075853 A1* | 3/2022 | Rana | G06F 21/31 |

OTHER PUBLICATIONS

"DeltaV SIS and Cybersecurity", White Paper, Emerson, Apr. 2020, URL:<https://www.emerson.com/documents/automation/white-paper-deltav-sis-cybersecurity-en-1262078.pdf> (20 pages).

* cited by examiner

METHOD AND SYSTEM FOR MANAGING WORKSTATION AUTHENTICATION

BACKGROUND

Electronic security typically involves multiple security layers to protect sensitive and important applications from unauthorized parties. In particular, multi-factor authentication may be performed in which a computer user is granted access to a website or application only after successfully presenting two or more pieces of evidence to an authentication mechanism. For example, this evidence may correspond to knowledge that only the user knows, something in a user's possession that only the user has, and/or a user's inherence that only the user is.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor and from a user device, a request to access a control system among various control systems. The method further includes determining, by the computer processor, whether a user associated with the user device is authorized to access the control system based on user information associated with the user in a database. The method further includes generating, by the computer processor and in response to determining that the user is authorized, a user code associated with a predetermined time period for accessing the control system. The method further includes transmitting, by the computer processor, the user code to the user device and the control system. The user code authenticates a user session between the user device and the control system. The method further includes transmitting, by the computer processor and in response to the predetermined time period expiring, a command that terminates the user session between the control system by the user device.

In general, in one aspect, embodiments relate to a server that includes a computer processor and a memory coupled to the computer processor. The memory obtains, from a user device, a request to access a control system among various control systems. The memory further determines whether a user associated with the user device is authorized to access the control system based on user information associated with the user in a database. The memory further generates, in response to determining that the user is authorized, a user code associated with a predetermined time period for accessing the control system. The memory further transmits the user code to the user device and the control system. The user code authenticates a user session between the user device and the control system. The memory further transmits, in response to the predetermined time period expiring, a command that terminates the user session between the control system by the user device.

In general, in one aspect, embodiments relate to a system that includes various user devices, various controls systems, and a server coupled to the user devices and the control systems. The server includes a computer processor. The server obtains, from a user device among the user devices, a request to access a control system among the control systems. The server further determines whether a user associated with the user device is authorized to access the control system based on user information associated with the user in a database. The server further generates, in response to determining that the user is authorized, a user code associated with a predetermined time period for accessing the control system. The server further transmits the user code to the user device and the control system. The user code authenticates a user session between the user device and the control system. The server further transmits, in response to the predetermined time period expiring, a command that terminates the user session between the control system by the user device.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
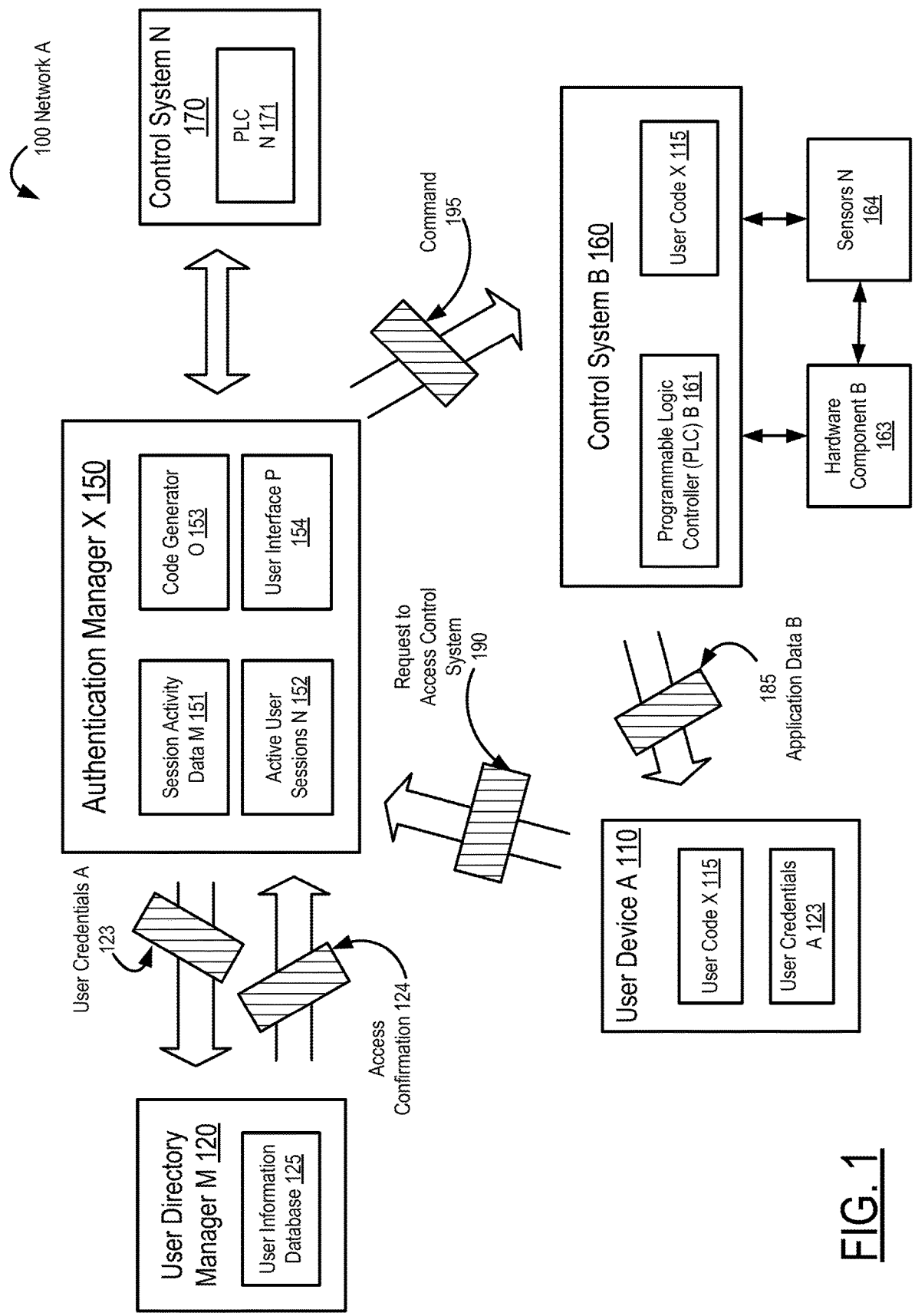
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using an authentication manager to implement a multi-factor authentication within a facility. In some embodiments, for example, a user code is independently distributed to a user and a control system for a particular user session. During the user session, the user may use a user device, such as an operator's workstation, to electronically access control systems operating at the facility. This user code may have a time limitation, where the user code only provide access for a predetermined time period. Once the time period expires, the user code also expires accordingly such that the user must obtain a new user code. In some embodiments, user activity is monitored, e.g. to determine inactivity or improper activity. Based on reviewing this user activity, an authentication manager may terminate a user session prematurely.

Furthermore, the user code may only be provided to a user in response to verifying the user's identity with a user directory manager as well as through a human check. With regard to the human check, a human administrator may be required to provide a confirmation to an authentication manager that the user is authorized to access one or more control systems. For example, an authentication manager may provide a graphical user interface that operates as a central dashboard for generating user codes and terminating user sessions. Thus, the human administrator may manage user sessions through this central dashboard.

Accordingly, methods and systems may control electronic access to critical control system applications through an authentication manager. With rising security threats, a control system may thereby be protected against unwanted access. In addition to utilizing usernames and passwords that have no time limits or tight monitoring/control, additional time-based protections may be implemented for further security and protection through user codes generated only upon request and with a respective time limit.

Turning to FIG. 1, FIG. 1 shows a schematic diagram in accordance with one or more embodiments. As shown in FIG. 1, a network (e.g., network A (100)) may include various user devices (e.g., user device A (110)), various control systems (e.g., control system B (160), control system N (170)), various network elements (not shown), a user directory manager (e.g., user directory manager M (120)), and/or an authentication manager (e.g., authentication manager X (150)). A control system may include hardware and/or software that monitors and/or operates equipment in an industrial facility, such as an industrial plant or refinery. Various types of control systems may be used, such as a programmable logic controller (PLC) (e.g., PLC B (161)), a distributed control system (DCS), or a supervisory control and data acquisition (SCADA) system. Examples of control systems may include one or more of the following: an emergency shut down (ESD) system, a safety control system, a video management system (VMS), a carbon capture and storage (CCS) system, a terminal management system (TMS), custody metering systems, process analyzers, various manufacturing systems, other industrial systems, etc. An authentication manager, user directory manager, user devices, and network elements may be computer systems similar to the computer system (502) described in FIG. 5 and the accompanying description.

A user directory manager may include hardware and/or software with functionality to manage permissions and access to network resources within a network. More specifically, the user directory manager may store user information as objects in a database (e.g., user information database A (125)) operated by a user directory manager. An object may be a single element, such as a user, group, application or device (e.g., an operator workstation). Moreover, a user directory manager may include a set of processes and services implemented on a local server or a remote server that authenticates users and devices in the network. For example, a user directory manager may be a domain controller that assigns and enforces various security policies for a computer network domain, such as through validating user credentials (e.g., passwords and user identifications, such as login IDs), user types (e.g., a normal user, a system administrator, etc.), and/or privilege levels (e.g., by specifying which control systems may be accessed by a particular user or user device). In some embodiments, the user directory manager uses a Lightweight Directory Access Protocol (LDAP) for directory services authentication and communication between various entities in a facility. An example of a user directory manager may be an Active Directory® server. Once a user directory manager verifies user credentials with respect to a predetermined time period for accessing one or more control systems, the user directory manager may transmit an access confirmation to an authentication manager. In particular, the access confirmation (e.g., access confirmation (124)) may be a network message that identifies one or more parameters (e.g., time duration, level of control system privileges, etc.) of a user session for a user and/or user device for accessing one or more control systems.

In some embodiments, an authentication manager includes hardware and/or software to implement a time-based multifactor authentication on a network. In particular, an authentication manager may be a server that generates and/or transmits user codes to control access to several control system applications within a facility, such as an industrial plant, data center, or other building. Thus, the authentication manager may provide multiple layers of protection with respect to machine and human factors. User codes may be specific to a person or a respective user device, such as a particular operator workstation in a facility. Likewise, a user code may be a single use password or security token, which may expire after a predetermined amount of time. For example, the user code may be a time-based one-time password (TOTP) that a user is required to manually enter into a user device.

In some embodiments, the user code is generated by the authentication manager upon obtaining a request (e.g., request to access control system (190)) from a user device or a user. The request may be a network message transmitted between a user device and an authentication manager that identifies a desire for a user session with one or more control systems. For example, the request may specify a desired time period for the user session, identify the user requesting the user session, and/or identify one or more control systems.

In some embodiments, an authentication manager includes a code generator (e.g., code generator O (153)) that includes hardware and/or software for generating one or more user codes (e.g., user code X (115)). In some embodiments, for example, the code generator is a pseudorandom number generator (PRNG) that produces a sequence of pseudorandom numbers that approximate a sequence of random numbers. A PRNG-generated sequence may not be truly random, because the sequence may be determined by an initial value as a primary input to create the sequence. Likewise, the pseudorandom sequence may eventually repeat. In some embodiments, the code generator is a hardware random number generator that include a circuit that generates random numbers based on physical processes, such as thermal noise, the photoelectric effect in an optical circuit, and other quantum phenomena.

After generating a user code, the authentication manager may implement multi-factor authentication by transmitting the user code to one or more components within a network. As shown in FIG. 1, for example, user code X (115) is transmitted to user device A (110) and control system B (160), while control system N (170) does not receive the user code. Accordingly, user device A (110) and control system B (160) may communicate after authenticating through user code X (115). In contrast, no communication may occur between user device A (110) and control system N (170). In some embodiments, user devices, users, and/or control systems obtain a user code through an out-of-band mechanism. Examples of out-of-band mechanisms may include transmission of the user code to a cellular device over a short message service (SMS) protocol or through a mobile application using push notifications, as well as manual provision to a computer device by a human administrator.

In some embodiments, the authentication manager includes functionality for transmitting commands (e.g., command (195)) to one or more control systems to terminate a user session associated with a user code. For example, the authentication manager X (150) may transmit a network message over a machine-to-machine protocol to control system B (160) to cause a premature expiration of user code X (115). Accordingly, communication between the user device A (110) and control system B (160) may terminate until a user or the user device A (110) obtains a new user code valid for a new user session. A command may be transmitted based on user inactivity during a user session and/or based on improper activity with respect to one or more control systems. Improper activity may include one or more unauthorized user operations, for example, based on user information stored by a user directory manager.

In some embodiments, the authentication manager may monitor user session activity. For example, an authentication manager may include a user interface (e.g., user interface P (154)) that enables communication with user devices, such as an administrator workstation. During a user session, a user device may receive application data (e.g., application data B (185)) from a respective control system. The application data may be based on sensor data acquired by the control system with respective to various functions and/or operations being performed by the control system. Using the application data, a user may make decisions with respect to the control system, such as adjusting settings and managing current and future operations of the control system. Thus, user session activity may describe user operations performed based on application data by a user or user device during their user session.

Keeping with the user interface provided by the authentication manager, the user interface may provide a graphical user interface that includes information regarding session activity data (e.g. session activity data M (151)) to various user devices and other devices over a network or in a cloud computing environment. As such, a user interface may be hardware and/or software that includes functionality for presenting data and/or receiving inputs from a user regarding commands in response to user session activity, such as inactivity or improper activity with respect to one or more control systems. For example, an authentication manager may transmit a notification to a human administrator regarding different types of control system access or inactivity. Based on the notification, the human administrator may terminate a user session or extend the user session. In some embodiments, the authentication manager automatically monitors user sessions independent of a human administrator. For example, the authentication manager may analyze in the background multiple user sessions for one or more users to determine user trends, predict control system activity, and/or generate reports.

Returning to control systems, a control system may include a programmable logic controller that may control valve states, fluid levels, pipe pressures, warning alarms, pressure releases and/or various hardware components throughout a facility. Thus, a programmable logic controller may be a ruggedized computer system with functionality to withstand vibrations, extreme temperatures, wet conditions, and/or dusty conditions, such as those around a refinery or drilling rig. With respect to distributed control systems, a distributed control system may be a computer system for managing various processes at a facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations.

On the other hand, a SCADA system may include a control system that includes functionality for enabling monitoring and issuing of process commands through local control at a facility as well as remote control outside the facility. For example, a SCADA system may include one or more supervisory computers, one or more remote terminal units, one or more PLCs, communication infrastructure such as network elements, a human-machine interface, and/or a historian, etc. With respect to an RTU, an RTU may include hardware and/or software, such as a microprocessor, that connects sensors and/or actuators using network connections to perform various processes in the automation system. Thus, the RTU may connect and enable communication between these process elements and a supervisory computer system.

Keeping with control systems, a control system may be coupled to facility equipment. Facility equipment may include various machinery such as one or more hardware components (e.g., hardware component B (163)) that may be monitored using one or more sensors (e.g., sensors N (164)). Examples of hardware components coupled to a control system may include crude oil preheaters, heat exchangers, pumps, valves, compressors, loading racks, and storage tanks among various other types of hardware components. Hardware components may also include various network elements or control elements for implementing control systems, such as switches, routers, hubs, PLCs, remote terminal units, user equipment, or any other technical components for performing specialized processes. Examples of sensors may include pressure sensors, torque sensors, rotary switches, weight sensors, position sensors, microswitches, hydrophones, accelerometers, etc.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
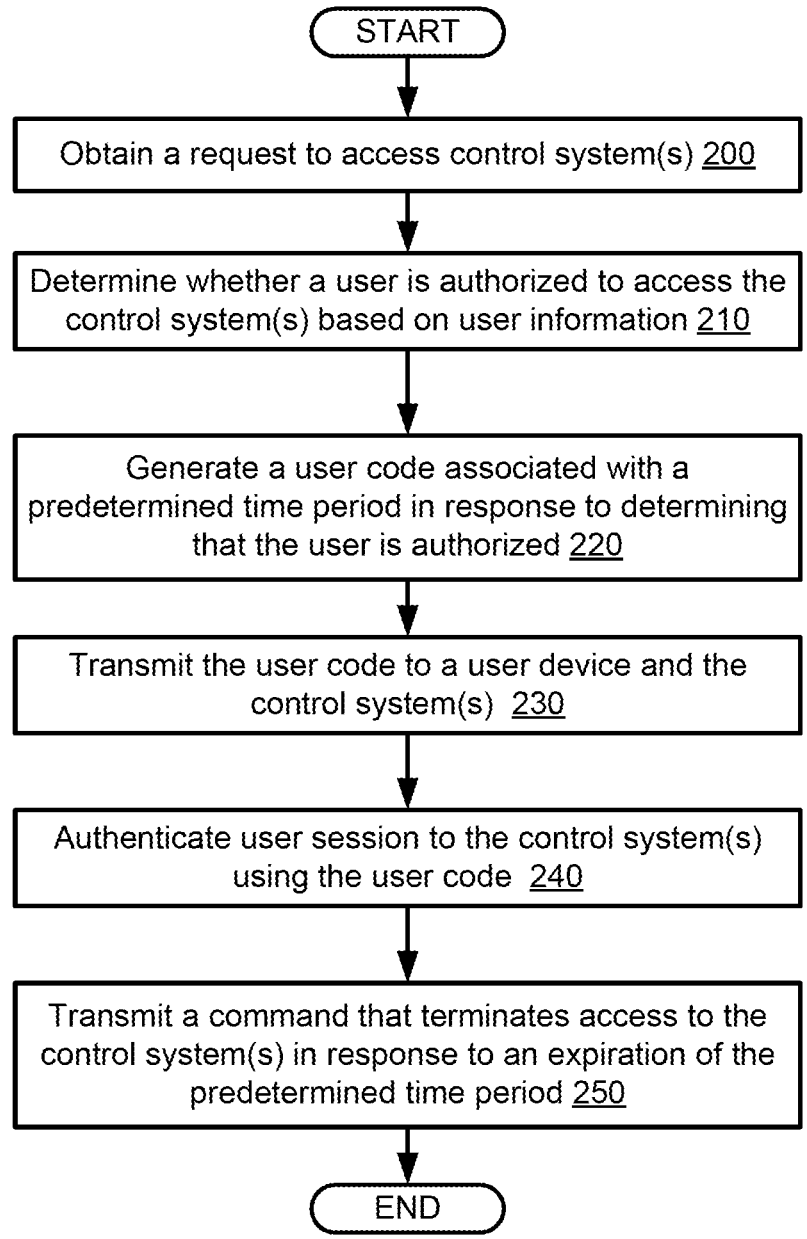
FIG. 2 shows a flowchart in accordance with one or more embodiments.

Turning to FIG. 2, FIG. 2 shows a flowchart in accordance with one or more embodiments. Specifically, FIG. 2 describes a general method for authenticating user sessions with control systems. One or more blocks in FIG. 2 may be performed by one or more components (e.g., authentication manager X (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a request is obtained to access one or more control systems in accordance with one or more embodiments. For example, a user may login into a user device, such as an operator station, with the user's credentials. The request may be a data message automatically transmitted by the user device to an authentication manager that triggers a request to access certain control systems associated with a user's profile and the current time in a user directory manager. The request to access one or more control systems may be similar to the request (190) described above in FIG. 1 and the accompanying description.

In Block 210, a determination is made whether a user is authorized to access one or more control systems based on user information in accordance with one or more embodiments. The authentication manager may confirm a user's identity and whether the user exists in a user directory manager. The confirmation may be performed based on user credentials and user information provided by the user as well as other identifying information such as keycards, RFID tags, facial recognition and/or voice recognition software. Likewise, a user's profile in the user directory manager may identify days and times when a user may access one or more control systems. The user information may also be updated periodically based on changes in employment records. In some embodiments, a human administrator may receive a notification in response to a request in Block 200, where the human administrator than independently verifies whether the user should have access to the requested control systems.

In Block 220, a user code associated with a predetermined time period is generated in response to determining that a user is authorized in accordance with one or more embodiments. In some embodiments, user codes are generated by a code generator such that a respective user code at a facility is unique and with a high complexity level and variant length. Moreover, the user codes may be time-based codes that access applications provided by one or more control systems. Thus, a user code is associated with a predetermined time period at generation such that the user code may expire at the end of the predetermined time period. The predetermined time period may be the same for user devices access control systems. Likewise, the predetermined time period may depend on user information, e.g., a specific user may only be allowed to access a filtration control system for four hours per week. In some embodiments, a human operator determines the predetermined time period using a central dashboard, e.g., in order to manage demand for a specific number of operator workstations.

Furthermore, if a user seeks to access a control system, the user may be blocked unless the user has a user code for that system. In some embodiments, the user code corresponds to a privilege level. For example, the privilege level may define one or more tasks that may be performed with a control system by a user device.

In Block 230, a user code is transmitted to a user device and one or more control systems in accordance with one or more embodiments. For example, an authentication manager may send the user code for storage in a control system database for determining user access. The user code may be transmitted over a network that includes a user device and the one or more control systems. Likewise, the user code may be transmitted using an out-of-band mechanism.

In Block 240, a user session to one or more control systems is authenticated using a user code in accordance with one or more embodiments. Once a user session is initiated using a user code, a user device or a user may be added to an active users list identifying active user sessions. These user sessions may be monitored by an authentication manager or a human administrator, for example. In some embodiments, the authentication manager or the human administrate may regenerate user codes to extend access for control systems, e.g., by selecting a graphical user button in a central dashboard.

In Block 250, a command is transmitted that terminates access to one or more control systems in response to an expiration of a predetermined time period in accordance with one or more embodiments. Once the predetermined time period is reached, a user session may terminate unless a new user code is obtained by an authentication manager. For example, a user may transmit a request for an extension of time. A human administrator using a central dashboard may approve or deny the request for the extension. Likewise, once the user code expires, the authentication manager may transmit a command to the control system to termination the user session. In some embodiments, the control system automatically deletes the user code and terminates the user session independently of any command (e.g., the control system may also receive a message specifying the length of time for the user session). In some embodiments, the authentication manager terminates the user session early, e.g., in response to detecting inactivity beyond a predetermined inactivity threshold. In another embodiment, the predetermined time period may refer to an inactivity time period.

Figure 3:
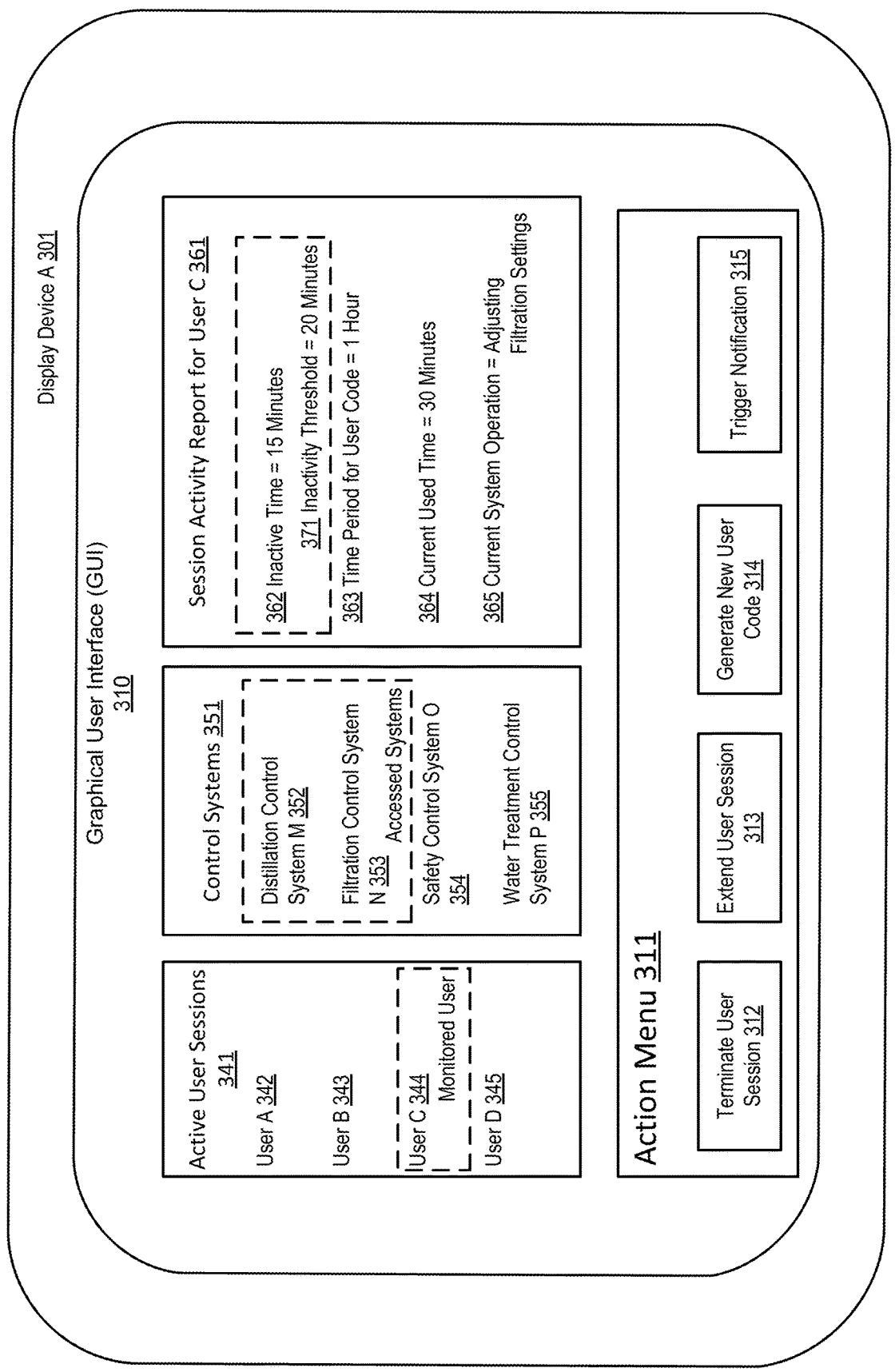
FIG. 3 shows an example in accordance with one or more embodiments.

Turning to FIG. 3, FIG. 3 illustrates an example of monitoring various user sessions using an authentication manager and through a user interface in accordance with one or more embodiments. In FIG. 3, a graphical user interface (GUI) (310) is provided on a display device A (301) of a user device. As shown in FIG. 3, the GUI (310) may provide information regarding various active user sessions (341) that provides a list of active users (i.e., user A (342), user B (343), user C (344), and user D (345)) who are accessing various control systems in a facility. For example, the facility includes various control systems (351) (i.e., distillation control system M (352), filtration control system N (353), safety control system O (354), water treatment control system P (355)) that may be accessible to different users. Thus, a human administrator may select user C (344) for monitoring. As such, the authentication manager determines that user C (344) is accessing the distillation control system M (352) and the filtration control system N (353). Likewise, the GUI (310) may provide real-time activity data regarding the users (342, 343, 344, 345). In regard to user C (344), for example, the GUI (310) includes a session activity report (361) for user C (342) identifying a current inactive time (362) of 15 minutes, while the inactivity threshold (371) is 20 minutes for terminating his user session. Likewise, the session activity report (361) further notes that user C (344) has a time period (363) of 1 hour for accessing two control systems (352, 353), where the current used time (364) is 30 minutes. The authentication manager further determines that the current system operation (365) of user C (344) includes adjusting filtration settings.

Keeping with FIG. 3, in some embodiments, an authentication manager provides an action menu (311) to a human administrator for selecting one or more commands based on session activity data or other information. For example, the action menu (311) may be a GUI window that automatically provides various recommendation options based on various predetermined criteria. In particular, the GUI (310) may provide a command to terminate a user session (312), a command to extend a user session (313), a command to generate a new user code (314), or a command that triggers a notification (315) that a respective user is approaching the end of the time period for his user session. In some embodiments, the notification may be an alert that a particular control system operation is outside a user's privilege level or otherwise improper. Thus, the GUI (310) may show various users who are currently accessing different control systems from different user devices. In some embodiments, the GUI (310) may show the corresponding time limits remaining for each user session.

Figure 4:
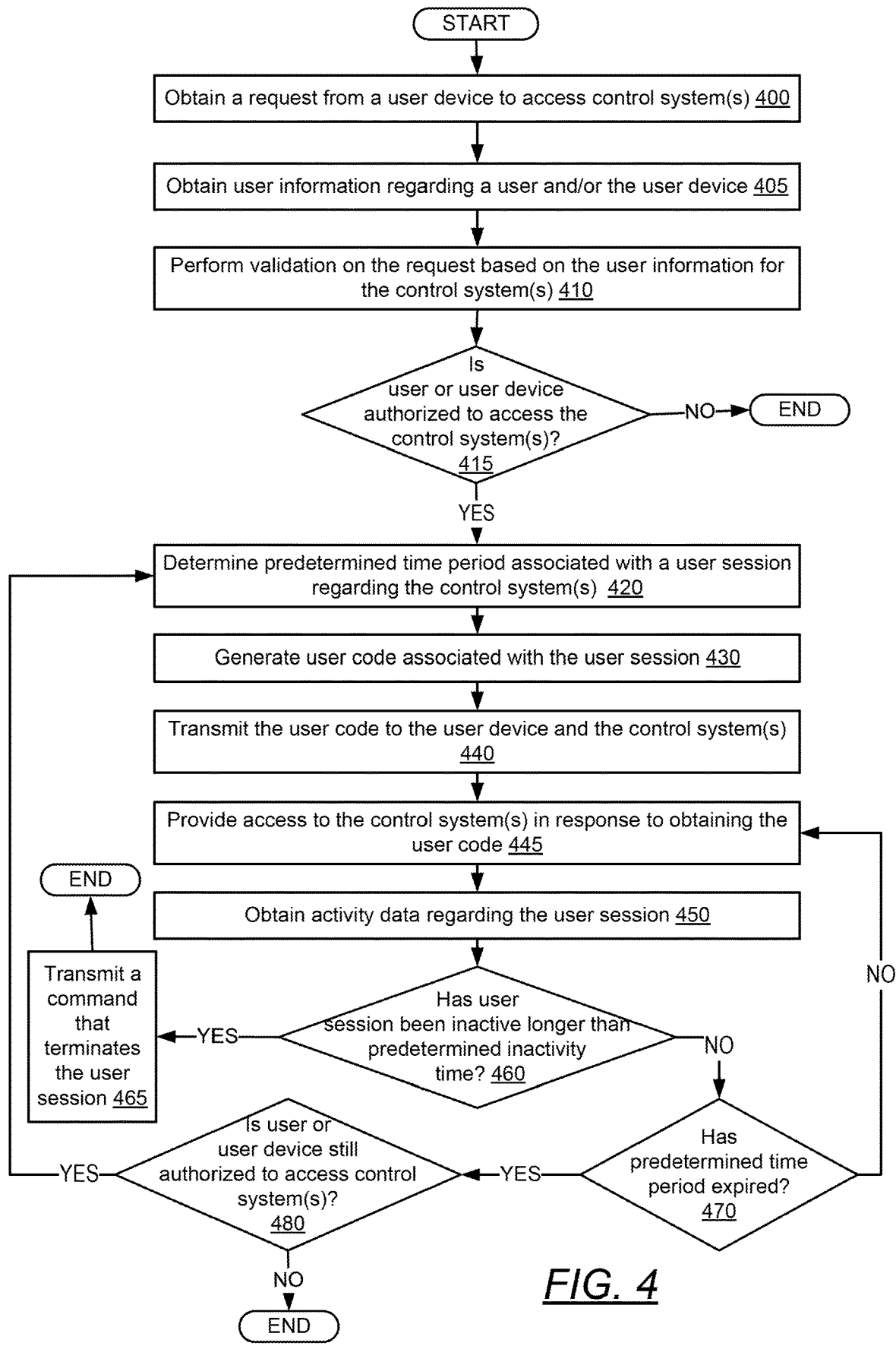
FIG. 4 shows a flowchart in accordance with one or more embodiments.

Turning to FIG. 4, FIG. 4 shows a flowchart in accordance with one or more embodiments. Specifically, FIG. 4 describes a specific method for authenticating user sessions with control systems. One or more blocks in FIG. 4 may be performed by one or more components (e.g., authentication manager X (150)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a request is obtained from a user device to access one or more control system(s) in accordance with one or more embodiments. For example, the request may be similar to the request described above in Block 200 of FIG. 2 and the accompanying description.

In Block 405, user information is obtained regarding a user and/or a user device in accordance with one or more embodiments. For example, the user information may be stored and administered by a user directory manager. In some embodiments, the user information identifies one or more time periods as well as one or more control systems that are accessible by a user or user device. As such, an authentication manager may transmit user credentials associated with a specific request to the user directory manager in order to determine the user information.

In Block 410, a validation is performed on a request based on user information for one or more control systems in accordance with one or more embodiments. In particular, a user directory manager and/or authentication manager may verify whether the request to access the one or more control systems is valid based on the user information. The validation may be performed by analyzing the current time, access levels and privileges associated with a user account, and/or information regarding the one or more control systems.

In Block 415, a determination is made whether a user and/or a user device are authorized to access one or more control systems in accordance with one or more embodiments. After verifying that a user is authorized to access a control system, an authentication manager may determine whether to provide control system access to a particular user device, e.g., the control system may be inoperative for maintenance. Likewise, if the user lacks permission to access one of the control systems, access may be refused by an authentication manager. Where a determination is made that a user or user device is not authorized to access a control system, the process shown in FIG. 4 may end. Where a determination is made that the user or the user device are authorized to access a control system, the process shown in FIG. 4 may proceed to Block 420.

In Block 420, a predetermined time period is determined that is associated with a user session regarding one or more control systems in accordance with one or more embodiments. For example, the predetermined time period may be set time period for respective user session or based on user information associated with a user. In some embodiments, the predetermined time period is similar to the predetermined time period described above in Block 220 of FIG. 2 and the accompanying description.

In Block 430, a user code associated with a user session is generated in accordance with one or more embodiments. In some embodiments, the user code is generated in a similar manner as described above in Block 220 of FIG. 2 and the accompanying description.

In Block 440, a user code is transmitted to a user device and one or more control systems in accordance with one or more embodiments.

In Block 445, access is provided to one or more control systems in response to obtaining a user code in accordance with one or more embodiments. By using the user code, for example, a user device may form a network connection using a communication protocol with a control system. Accordingly, the control system may exchange application data regarding one or more applications operating on the control system. Likewise, the user device may transmit commands to the control system, such as for adjusting application settings.

In Block 450, activity data are obtained regarding a user session in accordance with one or more embodiments. Activity data may be obtained directly from a user device or indirectly from a control system. In some embodiments, for example, an authentication manager may monitor the status of a user session status and the expiration time limit. Likewise, the activity data may be obtained for a real-time monitoring user interface that provides information on individual user sessions, control system operations, historical trends, and/or usage statistics for hardware components being managed by the component supply manager. Accordingly, the activity data may facilitate decision-making processes automatically by an authentication manager or for use by a human operator.

In Block 460, a determination is made whether a user session has been inactive longer than a predetermined inactivity time in accordance with one or more embodiments. For example, an authentication manager may logout users that have been inactive for a predetermined period of time, e.g., beyond an inactivity threshold. Where the inactivity threshold is 5 minutes and a user device has been inactive during a user session for 6 minutes, an authentication manager may trigger an inactivity procedure. For example, the authentication manager may transmit a command that triggers a notification in the user device alerting the user to their inactivity and warning the user about a possible end to their user session. Likewise, inactivity thresholds may be hard thresholds such that the authentication manager may automatically terminate the user session once the inactivity threshold is passed.

In Block 465, a command is transmitted that terminates a user session in accordance with one or more embodiments. For example, the command may set a user code in a control system to immediately expire. The command may be similar to the commands described above in Block 250 in FIG. 2 and the accompanying description.

In Block 470, a determination is made whether a predetermined time period has expired in accordance with one or more embodiments. For example, an authentication manager may record a time stamp when a user code is transmitted to a user device or user as well as a control system. Likewise, the controls system or user device may transmit an acknowledgement to the authentication manager that the user session has begun. Accordingly, the authentication manager may operate an internal clock to measure used time within a user session, such as through periodic time checks. Where the predetermined time period has not expired, the process shown in FIG. 4 may return to Block 445. Where a determination is made that the predetermined time period has expired, the process shown in FIG. 4 may proceed to Block 480.

In Block 480, a determination is made whether a user and/or a user device is still authorized to access one or more control systems in accordance with one or more embodiments. For example, a user may be authorized by their user profile to access a control system longer than the standard user session. Accordingly, an authentication manager may regenerate a user code to initiate a new user session or extend the current user session for a user device. Where a determination is made that the user or user device is still authorized to access one or more control systems, the process shown in FIG. 4 may return to Block 420. Where a determination is made that the user or user device has used their entire time allotment, the process shown in FIG. 4 may end.

In some embodiments, the processes described in FIGS. 2 and 4 above may combine different check points to capitalize on different security factors such as human factors and system factors. In contrast, other methods may capitalize on traditional protection methods using passwords to access process control operator stations or utilizing multi-factor authentication for non-process control systems. Likewise, these process may incorporates the time-based authentication to ensure maximum access control with respect to various control systems in a particular facility. Thus, this setup may be suitable to control access to several control systems applications within a building or data center where physical distances are not extreme and authentication may be achieved accordingly.

Figure 5:
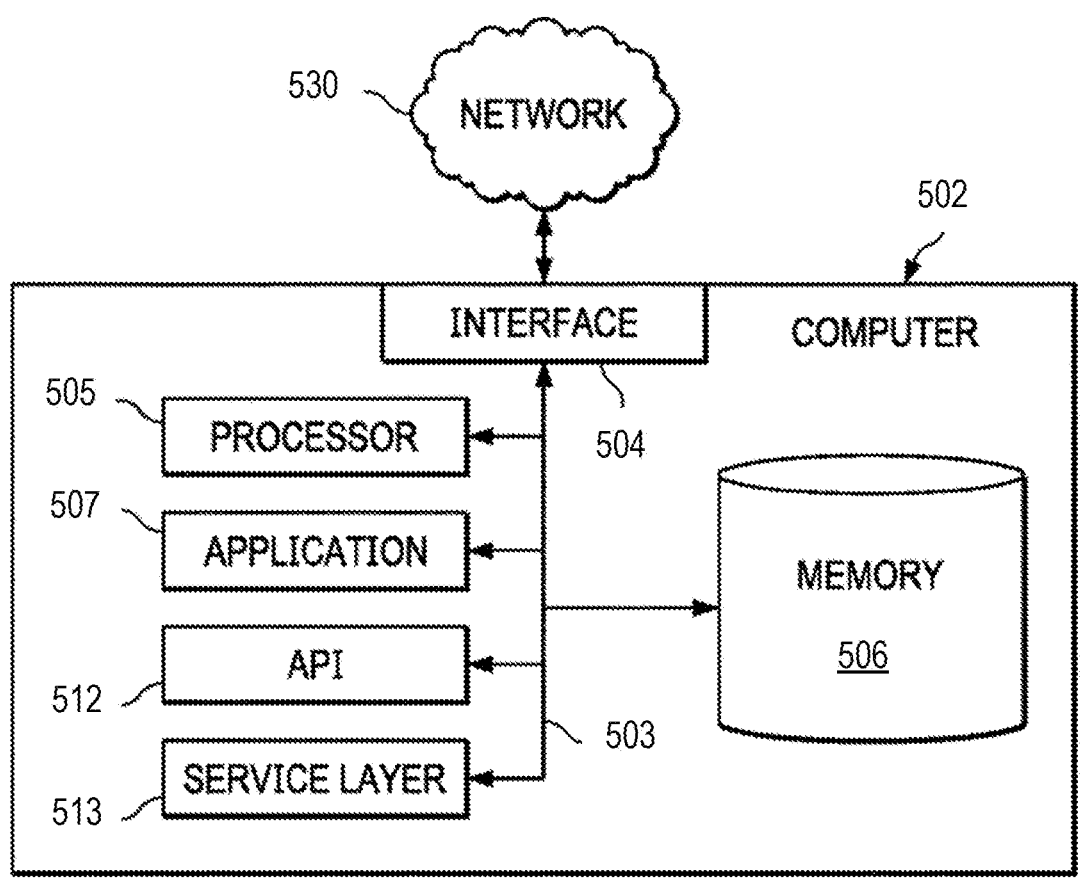
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single processor (505) in FIG. 5, two or more computer processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (5102) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a computer processor and from a user device, a request to access a control system among a plurality of control systems;
   determining, by the computer processor, whether a user associated with the user device is authorized to access the control system based on user information associated with the user in a database,
   wherein the user information is provided to the user device using an input device;
   generating, by the computer processor and in response to determining that the user is authorized, a first user code associated with a first predetermined time period for accessing the control system;
   transmitting, by the computer processor using an out-of-band mechanism comprising a short message service (SMS) protocol or a mobile application on the user device using push notifications, the first user code to the user device and the control system, wherein the first user code authenticates a first user session between the user device and the control system,
   wherein the out-of-band mechanism and the input device implement a multi-factor authentication that initiates the first user session on the control system; and
   transmitting, by the computer processor and in response to the first predetermined time period expiring, a first command that terminates the first user session between the control system by the user device.

2. The method of claim 1,
   wherein determining that the user is authorized is based on an input from a human administrator to a central dashboard coupled to a server that generates the first user code.

3. The method of claim 1,
   wherein the control system comprises one or more sensors, a programmable logic controller (PLC), and one or more hardware components coupled to the one or more sensors,
   wherein the user device communicates one or more commands to the control system during the first user session, and
   wherein the control system communicates sensor data to the user device during the first user session.

4. The method of claim 1, further comprising:
   obtaining activity data regarding the first user session, wherein the activity data describes one or more user operations performed with the control system;
   determining whether the user device is inactive based on the activity data; and
   transmitting, in response to determining that the user device has been inactive for a predetermined amount of time, a second command that terminates the first user session.

5. The method of claim 1, further comprising:
   obtaining activity data regarding the first user session, wherein the activity data describes one or more user operations performed with the control system;
   determining whether the user device is performing an unauthorized user operation with the control system; and
   transmitting, in response to determining that the user device is performing the unauthorized user operation, a second command that terminates the first user session.

6. The method of claim 1,
wherein the user information is managed by a user directory manager, and
wherein the user information identifies a plurality of authorized control systems and a plurality of privilege levels for the user.

7. The method of claim 1, further comprising:
determining that the first predetermined time period has expired;
generating, in response determining that the first predetermined time period has expired, a second user code associated with a second predetermined time period; and
transmitting the second user code to the user device and the control system, wherein the second user code authenticates a second user session between the user device and the control system.

8. The method of claim 1,
wherein the control system transmits application data to the user device during the first user session, and
wherein the user device transmits one or more commands to adjust one or more settings of the control system during the first user session.

9. The method of claim 1,
wherein the user device is an operator workstation within an industrial plant.

10. A server, comprising:
a computer processor; and
a memory storing instructions and coupled to the computer processor, wherein the computer processor when executed is configured to execute the instructions for:
obtaining, from a user device, a request to access a control system among a plurality of control systems;
determining whether a user associated with the user device is authorized to access the control system based on user information associated with the user in a database,
wherein the user information is provided to the user device using an input device;
generating, in response to determining that the user is authorized, a first user code associated with a first predetermined time period for accessing the control system;
transmitting, using an out-of-band mechanism comprising a short message service (SMS) protocol or a mobile application on the user device using push notifications, the first user code to the user device and the control system, wherein the first user code authenticates a first user session between the user device and the control system,
wherein the out-of-band mechanism and the input device implement a multi-factor authentication that initiates the first user session on the control system; and
transmitting, in response to the first predetermined time period expiring, a first command that terminates the first user session between the control system by the user device.

11. The server of claim 10,
wherein determining that the user is authorized is based on an input from a human administrator to a central dashboard coupled to a server that generates the first user code.

12. The server of claim 10, wherein the memory further comprises instructions executable by the computer processor and for:
obtaining activity data regarding the first user session, wherein the activity data describes one or more user operations performed with the control system;
determining whether the user device is inactive based on the activity data; and
transmitting, in response to determining that the user device has been inactive for a predetermined amount of time, a second command that terminates the first user session.

13. The server of claim 10, wherein the memory further comprises instructions executable by the computer processor and for:
obtaining activity data regarding the first user session, wherein the activity data describes one or more user operations performed with the control system;
determining whether the user device is performing an unauthorized user operation with the control system; and
transmitting, in response to determining that the user device is performing the unauthorized user operation, a second command that terminates the first user session.

14. The server of claim 10,
wherein the user information is managed by a user directory manager, and
wherein the user information identifies a plurality of authorized control systems and a plurality of privilege levels for the user.

15. The server of claim 10, wherein the memory further comprises instructions executable by the computer processor and for:
determining that the first predetermined time period has expired;
generating, in response determining that the first predetermined time period has expired, a second user code associated with a second predetermined time period; and
transmitting the second user code to the user device and the control system, wherein the second user code authenticates a second user session between the user device and the control system.

16. A system, comprising:
a plurality of user devices;
a plurality of control systems; and
a server coupled to the plurality of user devices and the plurality of control systems, wherein the server comprises a computer processor and is configured to:
obtain, from a user device among the plurality of user devices, a request to access a control system among the plurality of control systems;
determine whether a user associated with the user device is authorized to access the control system based on user information associated with the user in a database,
wherein the user information is provided to the user device using an input device;
generate, in response to determining that the user is authorized, a first user code associated with a first predetermined time period for accessing the control system;
transmit, using an out-of-band mechanism comprising a short message service (SMS) protocol or a mobile application on the user device using push notifications, the first user code to the user device and the control system, wherein the first user code authenticates a first user session between the user device and the control system, wherein the out-of-band mechanism and the input device implement a multi-factor authentication that initiates the first user session on the control system; and transmit, in response to the first predetermined time period expiring, a first command that terminates the first user session between the control system by the user device.

17. The system of claim 16, wherein the server is configured to provide a graphical user interface to a human administrator, wherein the graphical user interface comprises a central dashboard that obtains an input from the human administrator that determines whether the user is authorized to access the control system.

18. The system of claim 16, wherein the control system comprises one or more sensors, a programmable logic controller (PLC), and one or more hardware components coupled to the one or more sensors, wherein the user device communicates one or more commands to the control system during the first user session, and wherein the control system communicates sensor data to the user device during the first user session.

19. The system of claim 16, further comprising:

a user directory manager coupled to the server, wherein the user directory manager provides the user information to the server, and wherein the user information comprises a plurality of authorized control systems and a plurality of privilege levels for the user.

20. The system of claim 16, wherein the plurality of user devices are operator workstations within an industrial plant.

* * * * *